United States Patent Office 3,778,287
Patented Dec. 11, 1973

3,778,287
PIGMENT DISPERSIONS
James Frederick Stansfield and Arthur Topham, Manchester, England, assignors to Imperial Chemical Industries Limited, Millbank, London, England
No Drawing. Filed Dec. 2, 1971, Ser. No. 204,328
Claims priority, application Great Britain, Dec. 22, 1970, 60,903/70; June 14, 1971, 27,768/71
Int. Cl. C09c 3/02
U.S. Cl. 106—308 Q 8 Claims

ABSTRACT OF THE DISCLOSURE

Dispersions of inorganic pigments or lakes or toners in organic liquids which contain dissolved therein one or more polyesters or a salt thereof derived from a hydroxycarboxylic acid of the formula: HO—X—COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups. The dispersions are finely divided and well deflocculated, and are valuable in the manufacture of inks and paints.

---

This invention relates to dispersions of pigments in organic liquids and to the use of such dispersions.

According to the invention there are provided dispersions of inorganic pigments or lakes or toners in organic liquids which contain dissolved therein one or more polyesters or a salt thereof derived from a hydroxycarboxylic acid of the formula: HO—X—COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid wihch is free from hydroxy groups.

The said dispersions can be obtained by any of the conventional and well known methods of preparing dispersions. Thus the inorganic pigment, lake or toner, the organic liquid and the polyester, or mixture of polyesters, or salt thereof may be mixed in any order and the mixture then subjected to a mechanical treatment to reduce the particle size of the solid, for example by ball milling, bead milling, gravel milling or plastic milling until the dispersion is formed.

Alternatively, the inorganic pigment, lake or toner can be treated to reduce its particle size independently or in admixture with either the organic liquid or the polyester or salt thereof, and the other ingredient or ingredients then added following which dispersion can be obtained by stirring the mixture. Compositions obtained in this way and comprising the inorganic pigment, lake or toner in finely divided form and one or more of the said polyesters or a salt thereof are a further feature of the invention.

It is preferred that the amount of polyester or salt thereof present in the dispersions is such as corresponds to between 5 and 50% by weight, and preferably between 10 and 30%, based on the weight of the inorganic pigment, lake or toner, and the dispersions preferably contain from 5 to 70% by weight of the inorganic pigment, lake or toner based on the total weight of the dispersion.

The organic liquids used to prepare the said dispersions can be any inert organic liquids in which the said dispersing agents are at least partly soluble at ambient temperatures and which are stable under the subsequent conditions of usage of the dispersion. If desired mixtures of organic liquids can be used. Preferred organic liquids are hydrocarbons and halogenated hydrocarbons such as benzene, toluene, xylene, white spirit, chlorobenzene, carbon tetrachloride and perchloroethylene. Other organic liquids can however be used, for example esters such as butyl acetate, alcohols such as n-butanol, and heat bodied linseed oils used as lithographic varnish media. Above all it is preferred that the organic liquid is a predominantly aliphatic petroleum fraction. In general, the organic liquids or mixtures thereof used to prepare the dispersion will depend on the subsequent uses to which the dispersion are to be put.

The inorganic pigments are preferably those which contain a metal atom, and as examples of such pigments there may be mentioned titanium dioxide, prussian blue, cadmium sulphide, iron oxides, verimillion, ultramarine and chrome pigments including chromates of lead, zinc, barium and calcium and the various mixtures and modifications thereof such as are commercially available as greenish-yellow to red pigments under the names primrose, lemon, middle, orange, scarlet and red chromes.

The term "lake" denotes a water-insoluble metal salt of complex of an organic dyestuff which has been precipitated on a water-insoluble inorganic substrate such as alumina.

The term "toner" denotes a water-insoluble metal salt or complex, in particular a calcium or barium salt or complex, of a soluble or sparingly soluble organic dyestuff, in particular an azo dyestuff, which has optionally been prepared in the presence of an extender such as rosin.

Examples of the said inorganic pigments or lakes or toners are described in, for example, the second edition of the Colour Index (1956).

As specific examples of the said lakes and toners there may be mentioned the barium toner of 1-(2'-sulpho-4'-methyl-5'-chlorophenylazo)-2 - hydroxy - 3 - naphthoic acid, the nickel complex of 3-(4'-chlorophenylazo)quinoline-2:4-diol, the rosinated barium toner of 1-(2'-sulpho-4'-chloro - 5' - methylphenylazo)-2-naphthol, the aluminium lake of 1:4-dihydroxyanthraquinone - 2 - sulphonic acid and, above all, a rosinated calcium toner of 1-2'-sulpho(-4'-methylphenylazo) - 2 - hydroxy-3-naphthoic acid.

The polyesters used to prepare the dispersions of the invention can for example be obtained by heating the hydroxycarboxylic acid or a mixture of such acids or a mixture of the hydroxycarboxylic acid and a carboxylic acid, optionally in the presence of an esterification catalyst, preferably at a temperature in the region of 160° to 200° C., until the required molecular weight has been obtained. The course of the esterification can be followed by measuring the acid value of the product, the preferred polyesters having acid values in the range of 10 to 100 mgms. KOH/gm. and especially in the range of 20 to 50 mgms. KOH/gm. The water formed in the esterification reaction is removed from the reaction medium, and this can be conveniently done by passing a stream of nitrogen over the reaction mixture or, preferably, by carrying out the reaction in the presence of a solvent, such as toluene or xylene, and distilling off the water as it is formed.

The resulting polyesters can then be isolated in conventional manner; however, when the reaction is carried out in the presence of an organic solvent whose presence would not be harmful in the subsequent dispersion, then the resulting solution of the polyester can be used.

The salts of the polyesters can be either salts of the polyesters with metal atoms or salts with bases such as ammonia or organic derivatives thereof. The metal salts can conveniently be obtained, for example, by heating the polyester with an oxide, hydroxide or carbonate of the metal at elevated temperatures, for example at temperatures in the region of 200° C., the reaction being preferably carried out in an inert atmosphere. As examples of the said metals there may be mentioned alkali metals such as lithium, sodium and potassium, alkaline earth metals such as calcium and barium, and magnesium, lead, zinc and copper.

The amine salts can themselves be obtained, for example, by dissolving the ammonia or the amine in the polyester optionally at elevated temperatures, optionally in the presence of an organic liquid such as a petroleum fraction. As examples of said amines there may be mentioned alkylamines in particular lower alkylamines such as methylamine, diethylamine and triethylamine; arylamines preferably of the benzene series such as aniline, toluidine and anisidine; tetraalkylammonium hydroxides such as tetraethylammonium hydroxide; di- and poly-amines in particular di- and poly-lower alkylamines such as ethylenediamine and triethylene tetramine; and guanidine and derivatives thereof such as N:N'-diphenylguanidine.

In the said hydroxycarboxylic acids the radical represented by X preferably contains from 12 to 20 carbon atoms, and it is further preferred that there are between 8 and 14 carbon atoms between the carboxylic acid and hydroxy groups. It is also preferred that the hydroxy group is a secondary hydroxy group.

As specific examples of such hydroxycarboxylic acids there may be mentioned ricinoleic acid, a mixture of 9- and 10-hydroxystearic acids (obtained by sulphation of oleic acid followed by hydrolysis), and 12-hydroxystearic acid, and especially the commercially available hydrogenated castor oil fatty acid which contains in addition to 12-hydroxystearic acid minor amounts of stearic acid and palmitic acid.

The carboxylic acids which can be used in conjunction with the hydroxycarboxylic acids to obtain the polyesters are preferably carboxylic acids of saturated or unsaturated aliphatic compounds, particularly alkyl and alkenyl carboxylic acids containing a chain of from 8 to 20 carbon atoms. As examples of such acids there may be mentioned lauric acid, palmitic acid, stearic acid and oleic acid.

The dispersions of the invention are fluid or semifluid compositions containing the inorganic pigment, lake or toner in finely divided and usually deflocculated form, and can be used for any purpose for which dispersions of these particular solids are conventionally used. Thus the dispersions are of particular value in the manufacture of printing inks, by incorporating the dispersions with the other components conventionally used in the manufacture of such inks. The dispersions are also of value in the manufacture of paints, for which purpose the dispersions are incorporated into conventional alkyd or other resins.

The invention is illustrated but not limited by the following examples in which the parts and percentages are by weight.

Polyesters are prepared as follows:

POLYESTER A

A mixture of 348 parts of xylene and 3350 parts of a commercial grade of 12-hydroxystearic acid (having acid and hydroxyl values of 182 mg. KOH/gm. and 160 mg. KOH/gm. respectively) is stirred for 22 hours at 190° to 200° C., the water formed in the reaction being separated from the xylene in the distillate which is then returned to the reaction medium. After 152 parts of water have been collected, the xylene is removed by heating at 200° C. in a stream of nitrogen. The resulting pale amber coloured liquid has an acid value of 33.0 mgms. KOH/gm.

POLYESTER B

A mixture of 130 parts of xylene, 284 parts of stearic acid and 716 parts of 12-hydroxystearic acid is heated for 22 hours at 190° C. to 200° C., the water formed in the reaction being separated from the xylene in the distillate which is then returned to the reaction mixture. The xylene is then removed by heating at 180° C. at a pressure less than atmospheric. The residual liquid is cooled to 50° C., an equal volume of a petroleum fraction boiling in the range of 100° to 120° C. is added, the mixture cooled to 10° C. and the mixture filtered to remove stearic acid. The solvent is then removed by distillation at 100° C. under reduced pressure, leaving the polyester in the form of a pale amber coloured viscous liquid having an acid value of 82.5 mgms. KOH/gm.

POLYESTER C

A mixture of 65 parts of xylene and 500 parts of a commercially available grade of ricinoleic acid is heated for 22 hours at 190° to 200° C., the water being distilled off as it is formed. The xylene is then removed by distillation at 150° C. at reduced pressure. The resulting polyester has an acid value of 13.7 mgms. KOH/gm.

POLYESTER D

A mixture of 96 parts of xylene, 150 parts of oleic acid and 850 parts of ricinoleic acid is heated for 22 hours at 190° to 200° C., the water being distilled off as it is formed. The xylene is then removed by distillation at 150° C. under reduced pressure. The resulting polyester has an acid value of 36.6 mgms. KOH/gm.

POLYESTER E

A mixture of 9- and 10-hydroxystearic acids (which have been prepared from oleic acid) is heated at 160° to 170° C. for 16 hours in a current of nitrogen. The resulting polyester has an acid value of 36.0 mgms. KOH/gm.

EXAMPLE 1

A mixture of 3 parts of rosinated calcium toner of 1-(2'-sulpho-4'-methylphenylazo) - 2 - naphthol - 3 - carboxylic acid, 1.5 parts of Polyester A and 5.5 parts of a petroleum fraction boiling at 100° to 120° C. is ball milled for 16 hours to give a fluid, finely divided and well deflocculated dispersion of the pigment which is suitable for use in a gravure printing ink.

Similar dispersions are obtained when the above pigment is replaced by any of the following:

(a) barium toner of 1-(2'-sulpho-4'-methyl-5'-chlorophenylazo)-2-naphthol-3-carboxylic acid,
(b) lead sulphochromate,
(c) nickel toner of 3-(4'-chlorophenylazo)quinoline-2:4-diol,
(d) prussian blue
(e) rosinated barium toner of 1-(2'-sulpho-4'-chloro-5'-methyl-phenylazo)-2-naphthol,
(f) aluminium lake of 1:4-dihydroxyanthraquinone-2-sulphonic acid,
(g) Tioxide RCR, which is a coated form of rutile titanium dioxide,
(h) Iron oxide.

EXAMPLE 2

A mixture of 4 parts of a rosinated calcium toner of 1-(2'-sulpho - 4' - methylphenylazo)-2-naphthol-3-carboxylic acid, 0.4 parts of Polyester D and 5.6 parts of a petroleum fraction boiling at 100° to 120° C. is ball milled for 16 hours to give a fluid, finely divided and well deflocculated dispersion of the pigment which is suitable for use in a gravure printing ink.

Similar dispersions are obtained by using Polyester B or Polyester C in place of Polyester D.

EXAMPLE 3

A mixture of 3 parts of a rosinated calcium toner of 1-(2'-sulpho - 4' - methylphenylazo)-2-naphthol-3-carboxylic acid, 1.5 parts of Polyester A and 5.5 parts of a petroleum fraction boiling at 155° to 205° C. is ball milled for 16 hours to give a fluid, finely-divided and well deflocculated dispersion of the pigment which is suitable for use in a gravure printing ink.

A similar disperson is obtained by using n-hexane or butyl acetate in place of the petroleum fraction, whilst similar although less fluid dispersions are obtained by us-

EXAMPLE 4

A mixture of 60 parts of a rosinated calcium toner of 1-(2' - sulpho-4'-methylphenylazo)-2-naphthol-3-carboxylic acid, 9 parts of Polyester A and 131 parts of a petroleum fraction boiling at 100° to 120° C. is gravel milled for 48 hours to give a fluid, finely-divided and well deflocculated dispersion of the pigment. The dispersion when incorporated into a gravure printing ink has excellent strength, brightness and transparency and in these respects is superior to conventional dispersions of the same pigment.

EXAMPLE 5

A mixture of 60 parts of the manganese toner of 1-(3'-sulpho-4'-chlorophenylazo) - 2 - naphthol-3-carboxylic acid, 9 parts of Polyester A and 131 parts of a petroleum fraction boiling at 100° to 120° C. is gravel milled to give a fluid dispersion. The resulting dispersion is suitable for use in a gravure printing ink, and possesses increased strength and brightness and in these respects is superior to conventional dispersions of the same pigment.

A similar dispersion is obtained when the above pigment is replaced by an equal amount of the strontium toner of 1-(2'-sulpho-4'-methyl - 5' - chlorophenylazo)-2-naphthol-3-carboxylic acid.

EXAMPLE 6

A mixture of 24 parts of a rosinated calcium toner of 1-(2'-sulpho-4'-methylphenylazo) - 2-naphthol-3-carboxylic acid, 2.4 parts of Polyester A and 10 parts of a petroleum fraction boiling at 260° C. to 290° C. is plastic milled for 1 hour in a Baker Perkins mixer. A further 3.6 parts of the petroleum fraction is then added and the milling continued until a homogeneous mixture is obtained. The resulting finely divided and well defloccuiated dispersion of the pigment is suitable for use in a letterpress printing ink.

EXAMPLE 7

A mixture of 3 parts of a rosinated calcium toner of 1-(2'-sulpho-4'-methylphenylazo) - 2-naphthol-3-carboxylic acid, 1.5 parts of Polyester E and 5.5 parts of a petroleum fraction boiling at 100° to 120° C. is ball milled for 16 hours to give a finely divided and well defloccuiated dispersion of the pigment.

POLYESTER F

A mixture of 27 parts of toluene and 400 parts of a commercial grade of 12-hydroxystearic acid (having acid and hydroxyl values of 182 mg. KOH/gm. and 160 mg. KOH/gm. respectively) is stirred for 10 hours at 190° to 200° C. under an atmosphere of nitrogen, the water formed in the reaction being separated from the toluene in the distillate which is then returned to the reaction medium. The bulk of the toluene is then removed by distillation at the same temperature.

The resulting pale amber coloured liquid contains 98.7% of a polyester having an acid value of 36.6 mg. KOH/gm.

SALTS OF POLYESTER F (1) A mixture of 250 parts of Polyester F and 5.9 parts of lithium carbonate is stirred for 10 minutes at 200° C. under an atmosphere of nitrogen. The mixture is cooled and then centrifuged to remove a little unreacted solid. A viscous liquid is obtained. The barium salt is prepared in a similar manner but starting from 25 parts of barium hydroxide octahydrate.

(2) A mixture of 250 parts of Polyester F and 8.5 parts of sodium carbonate is stirred for 20 minutes at 200° C. under an atmosphere of nitrogen. The highly viscous liquid so obtained is diluted with a petroleum fraction boiling at 100° to 120° C. to give a solution containing 70.5% of non-volatile material. The potassium and magnesium salts are prepared in a similar manner using the appropriate amounts of potassium bicarbonate or magnesium oxide.

(3) A mixture of 250 parts of Polyester F and 5.9 parts of calcium hydroxide is stirred for 10 minutes at 200° C. under an atmosphere of nitrogen. When cold, a viscous liquid is obtained.

The lead salt is prepared in a similar manner starting from 17.9 parts of lead monoxide.

(4) A mixture of 250 parts of Polyester F and 6.4 parts of cupric oxide is stirred for 100 minutes at 200° C. under at atmosphere of nitrogen. The mixture is cooled, diluted with a petroleum fraction boiling at 100° to 120° C. and filtered to give a green solution containing 70.3% of non-volatile material.

(5) A mixture of 250 parts of Polyester F and 6.5 parts of zinc oxide is stirred for 10 minutes at 200° C. under an atmosphere of nitrogen. The mixture is cooled, diluted with a petroleum fraction boiling at 100° to 120° C., and filtered to give a solution containing 64.3% of non-volatile material.

(6) A mixture of 155 parts of Polyester F, 213 parts of a petroleum fraction boiling at 100° to 120° C. and 58.8 parts of a 25% aqueous solution of tetraethylammonium hydroxide is stirred at the boil under a reflux condenser, the water in the distillate being separated off, and the petroleum fraction being returned to the reaction medium; the reaction being complete when all the water has distilled off. The resulting solution contains 42.3% of non-volatile material.

(7) A mixture of 155 parts of Polyester F and 155 parts of a petroleum fraction boiling at 100° to 120° C. is stirred whilst ammonia is passed into the mixture, until 1.7 parts of ammonia have been absorbed. A 49.8% solution of the ammonium salt is obtained.

(8) A mixture of 250 parts of Polyester F and 6.5 parts of triethylene tetramine is heated with stirring to 100° C. 106.5 parts of a petroleum fraction boiling at 100° to 120° C. are then added to give a 62.2% solution of the salt.

(9) A mixture of 250 parts of Polyester F and 33.8 parts of N:N'-diphenylguanidine is stirred at 105° C. until a clear liquid is obtained.

EXAMPLE 8

A mixture of 4 parts of a rosinated calcium toner of 1-(2'-sulpho - 4' - methylphenylazo) - 2 - naphthol-3-carboxylic acid, and 6 parts of a 3.3% solution in a petroleum fraction boiling at 100° C. to 120° C. of the calcium salt of Polyester F is ball milled for 16 hours to give a finely divided and well defloccuiated dispersion of the pigment which is suitable for use in a gravure printing ink.

Similar dispersions are obtained if the calcium salt of Polyester F is replaced by any of the other salts described above.

EXAMPLE 9

A mixture of 3 parts of a barioum toner of 1-(2'-sulpho-4'-methyl-5' - chlorophenylazo) - 2 - naphthol-3-carboxylic acid and 7 parts of a 21.5% solution in a petroleum fraction boiling at 100° to 120° C. of the calcium salt of Polyester F is ball milled for 16 hours to give a fluid, finely divided and well defloccuiated dispersion of the pigment which is suitable for use in a gravure printing ink.

Similar dispersions are obtained when the above pigment is replaced by any of the following:

(a) calcium toner of 1-(2'-sulpho-4'-methyl-5'-chlorophenylazo)-2-naphthol-3-carboxylic acid,
(b) manganese toner of 1-(3'-sulpho - 4' - chlorophenylazo)-2-naphthol-3-carboxylic acid,
(c) lead sulphochromate, (d) Tioxide RCR, which is a coated form of rutile titanium dioxide,
(e) iron oxide.

EXAMPLE 10

A mixture of 80 parts of a rosinated calcium toner of 1 - (2' - sulpho-4'-methylphenylazo)-2-naphthol-3-carboxylic acid, 8 parts of the calcium salt of Polyester F and 112 parts of a petroleum fraction boiling at 100° to 120° C. is gravel milled for 48 hours to give a fluid, finely divided and well deflocculated dispersion of the pigment. The resulting dispersion, when incorporated into a gravure printing ink, has excellent strength, brightness and transparency, and in these respects is superior to conventional dispersions of the same pigment.

Similar results are obtained when the calcium salt of Polyester F is replaced by the barium, sodium, potassium, magnesium, copper and zinc salts described above.

We claim:

1. Dispersions of inorganic pigments or lakes or toners in organic liquids which contain dissolved therein one or more polyesters or a salt thereof derived from a hydroxycarboxylic acid of the formula: HO—X—COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups.

2. Dispersions as claimed in claim 1 wherein the amount of the polyester or salt thereof is between 5 and 50% by weight based on the weight of the inorganic pigment, lake or toner.

3. Dispersions as claimed in claim 2 wherein the amount of the polyester or salt thereof is between 10 and 30% by weight based on the weight of the inorganic pigment, lake or toner.

4. Dispersions as claimed in claim 1 wherein the amount of the inorganic pigment, lake or toner is from 5 to 70% by weight based on the total weight of the dispersion.

5. Dispersions as claimed in claim 1 which contain the free polyester.

6. Dispersions as claimed in claim 1 wherein the organic liquid is a hydrocarbon or halogenated hydrocarbon.

7. Dispersions as claimed in claim 6 wherein the organic liquid is a predominantly aliphatic petroleum fraction.

8. Dispersions as claimed in claim 1 wherein the toner is a rosinated calcium or barium toner of a soluble or sparingly soluble azo dyestuff.

References Cited

UNITED STATES PATENTS

| | | | |
|---|---|---|---|
| 3,694,239 | 9/1972 | Simon | 106—309 |
| 3,436,239 | 4/1969 | Feld | 106—300 |
| 3,577,254 | 5/1971 | Petke | 106—308 Q |

DELBERT E. GANTZ, Primary Examiner

J. V. HOWARD, Assistant Examiner

U.S. Cl. X.R.

106—308 M